United States Patent [19]

Fay, III

[11] Patent Number: 4,549,671

[45] Date of Patent: Oct. 29, 1985

[54] FLUSH MOUNTED HINGE ASSEMBLY HAVING A FLOATING LINK

[75] Inventor: William A. Fay, III, Dover, Pa.

[73] Assignee: Harsco Corporation, Wormleysburg, Pa.

[21] Appl. No.: 627,562

[22] Filed: Jul. 3, 1984

[51] Int. Cl.[4] ............................................... E05D 3/06
[52] U.S. Cl. ..................................... 220/344; 16/366; .16/375; 16/381
[58] Field of Search ................. 16/366, 371, 375, 381; 220/344

[56] References Cited

U.S. PATENT DOCUMENTS

| | | |
|---|---|---|
| 828,649 | 8/1906 | Greenawalt . |
| 1,505,593 | 8/1924 | Fryer . |
| 2,530,160 | 11/1950 | Finley .............................. 220/344 X |
| 2,564,988 | 8/1951 | Muller ..................................... 20/16 |
| 2,602,954 | 7/1952 | Steward ................................ 16/378 |
| 2,625,731 | 1/1953 | Richmond ...................... 220/344 X |
| 3,183,548 | 5/1965 | Speakman ............................. 16/163 |
| 3,621,512 | 11/1971 | Johnson ................................ 16/380 |
| 4,236,441 | 12/1980 | Turner et al. . |
| 4,351,085 | 9/1982 | Suska ............................... 16/380 X |

Primary Examiner—Fred Silverberg
Attorney, Agent, or Firm—Kerkam, Stowell, Kondracki & Clarke

[57] ABSTRACT

A flush mounted hinge assembly for pivotally mounting a heavy closure on an armored vehicle such that the closure is disposed within an opening in the vehicle hull and is pivotal at least 180° to an open position comprises two pairs of first and second hinge plates pivotally connected to intermediate hinge members so as to enable the first and second hinge plates to pivot about substantially parallel axes with respect to the intermediate hinge members. The hinge plates are disposed within recesses in the exterior surfaces of the closure and the hull, and the intermediate hinge members are mounted on an outwardly facing surface of a floating link member which extends between the intermediate hinge members and which constrains the intermediate hinge members for concerted movement. Seals are provided between the interior surface of the closure and a backing stop provided by the hull, and between the floating link member and the back side of the hinge plates and the closure for sealing the opening when the closure is in closed position.

8 Claims, 7 Drawing Figures

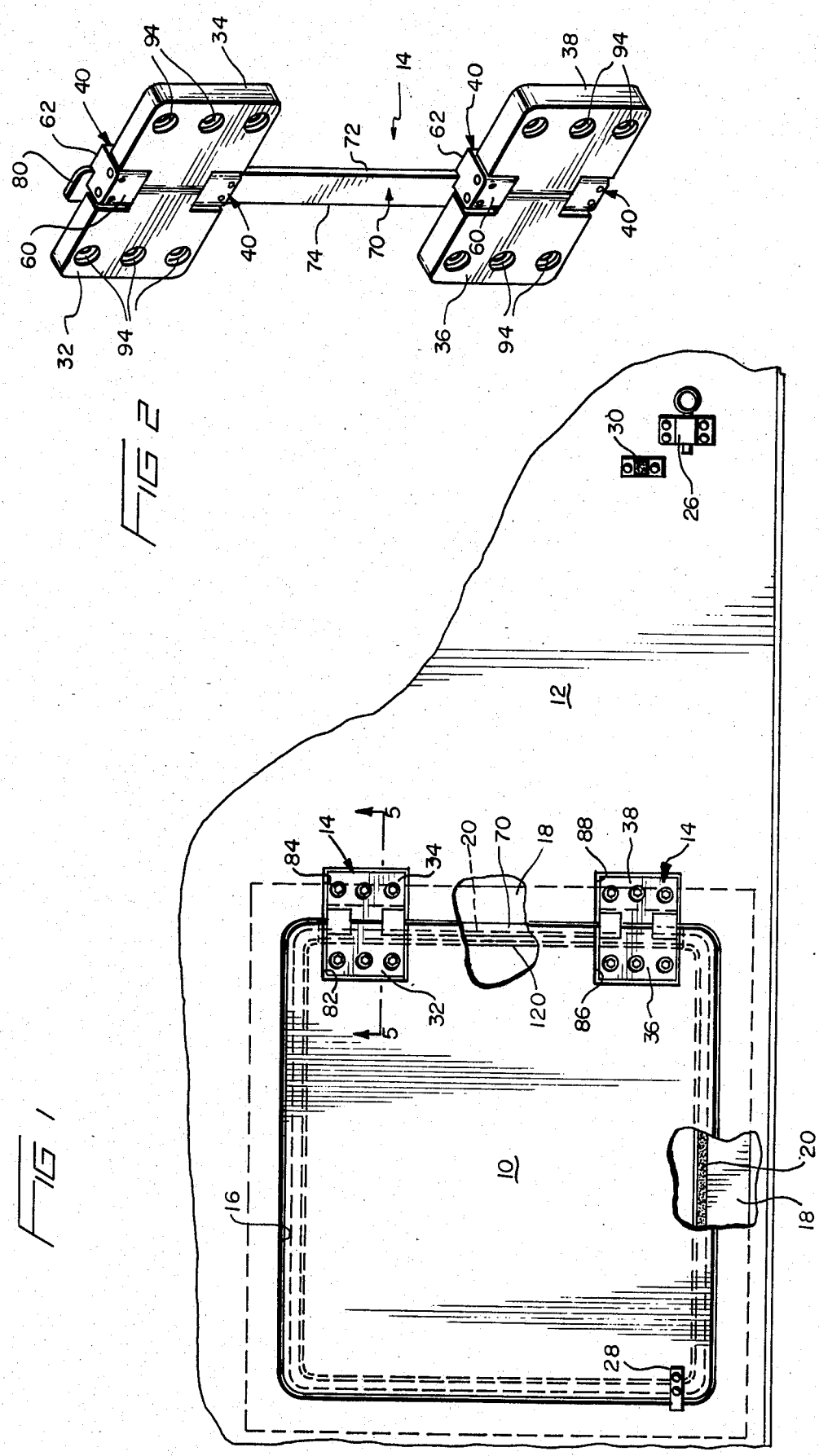

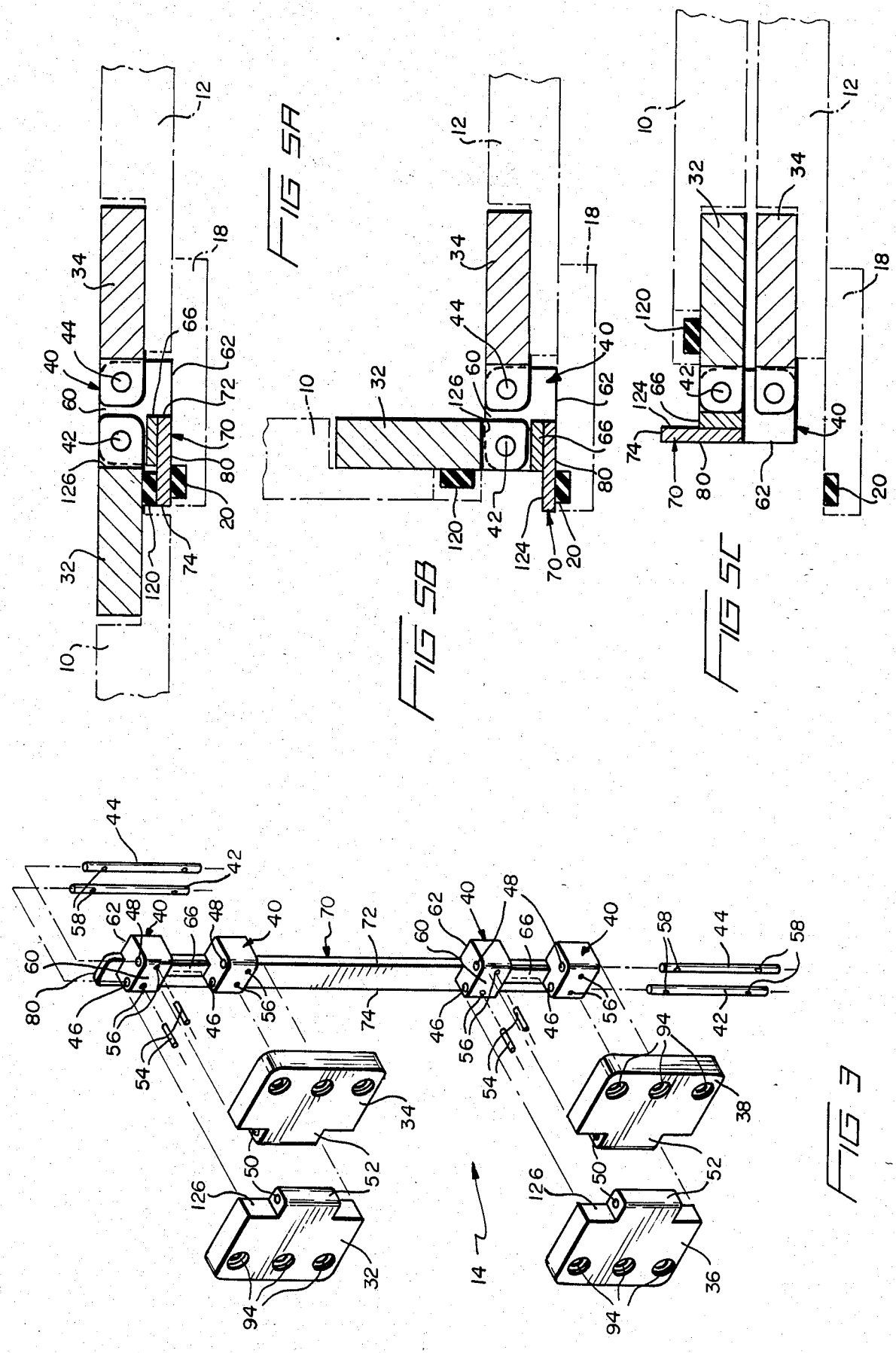

FLUSH MOUNTED HINGE ASSEMBLY HAVING A FLOATING LINK

BACKGROUND OF THE INVENTION

The present invention relates generally to armored military vehicles, and more particularly to flush mounted hinge assemblies for pivotally mounting heavy closures such as doors or hatches on the vehicle hull flush with its exterior surface, and which enable at least 180° movement of the closure relative to the hull.

U.S. Pat. No. 4,236,441 to Turner et al, assigned to the assignee of the present invention, relates to a field artillary ammunition support vehicle comprising an armored body mounted on a tracked chassis for resupplying ammunition to a self-propelled artillary weapon such as a tank. The armored body provides protection for the driver and crew of the vehicle, as well as for the ammunition it carries. Within the vehicle, projectiles are stored on racks and propellant charges are stored in compartments. A powered extensible hoist and conveyor are included for enabling racks of projectiles to be moved about and for conveying projectiles and propellant charges to the artillary weapon. Heavy armored closures, such as hatches or doors, cover access openings in the top, rear and sides of the vehicle.

It is particularly important that the side doors of such vehicles and their mounting hinges be flush with the exterior surface of the vehicle hull to enable the vehicle to traverse narrow passageways and to prevent damage to the doors and/or hinges occasioned, for example, by the vehicle scraping against fixed structures or other objects. It is also important that the doors be capable of 180° movement with respect to the body so that they may be opened fully and positioned adjacent the exterior surface of the vehicle in order to provide unimpeded access to the interior of the vehicle, and that their hinge assemblies have good mechanical strength to support the heavy doors and enable smooth operation, as well as providing correct indexing so that the doors close properly. Furthermore, the openings in the vehicle must be adequately sealed against the passage of water or air when the doors are closed. Although the art is replete with various types of hinges, there are no known hinge assemblies which satifactorily satisfy these requirements.

SUMMARY OF THE INVENTION

The invention provides a new and improved flush mounted hinge assembly that satisfies the above-mentioned objectives, and avoids other disadvantages of known hinge assemblies. Hinge assemblies in accordance with the invention enable both the hinge assemby and an associated closure to be flush mounted with respect to the exterior hull surface of an armored vehicle on which the closure is employed, enable the closure to be opened at least 180° so that it can be positioned adjacent the exterior surface, provide proper indexing to insure smooth operation, and enable a good seal to be provided between the closure and hinge assembly and the opening in the structure.

Briefly stated, the invention provides a hinge assembly that comprises first and second spaced pairs of first and second hinge plates, the hinge plates of each pair being pivotally connected to an intermediate hinge member so as to enable the first and second plates to pivot about respective first and second substantially parallel axes. The first hinge plate of each pair is adapted to be mounted in a recess in the exterior surface of the vehicle hull on which the closure is employed adjacent to an opening in the hull, and the second hinge plate is adapted to be mounted in another recess in the exterior surface of the closure such that the hinge plates are substantially flush with the exterior surfaces. An elongated floating link member extends between the intermediate hinge members of the first and second spaced pairs of hinge plates, the intermediate hinge members being mounted on an outwardly facing surface of the link member offset to one side of the link member such that the first axis is positioned laterally beyond a first side of the link member and such that the opposite side of the link member extends laterally in an opposite direction beyond the second axis, and a seal supported on a backing stop for the closure provided by the hull for sealingly engaging the inwardly facing surface of the link member on the interior surface of the closure.

The assembly may further include an elongated resilient seal substantially coextensive with the link member, which is attached to a backside of the second hinge plates and to the interior surface of the closure, preferably within a cutout in the interior surface. The seal is sized so as to be positioned within a space between the backside of the hinge plates and the closure and the link member in order to engage sealingly the link member when the closure is in closed positioned.

BRIEF DESCRIPTION OF THE DRAWINGS

FIG. 1 is a side view, partially broken away, illustrating a flush mounted hinge assembly in accordance with the invention for mounting a door on a structure;

FIG. 2 is a perspective view of the hinge assembly of FIG. 1;

FIG. 3 is an exploded perspective view of the hinge assembly;

FIGS. 5A-C comprise a sequence of diagrammatic views taken approximately along the line 5—5 of FIG. 1 which illustrate the operation of the hinge assembly.

DESCRIPTION OF THE PREFERRED EMBODIMENT

Figure 4:
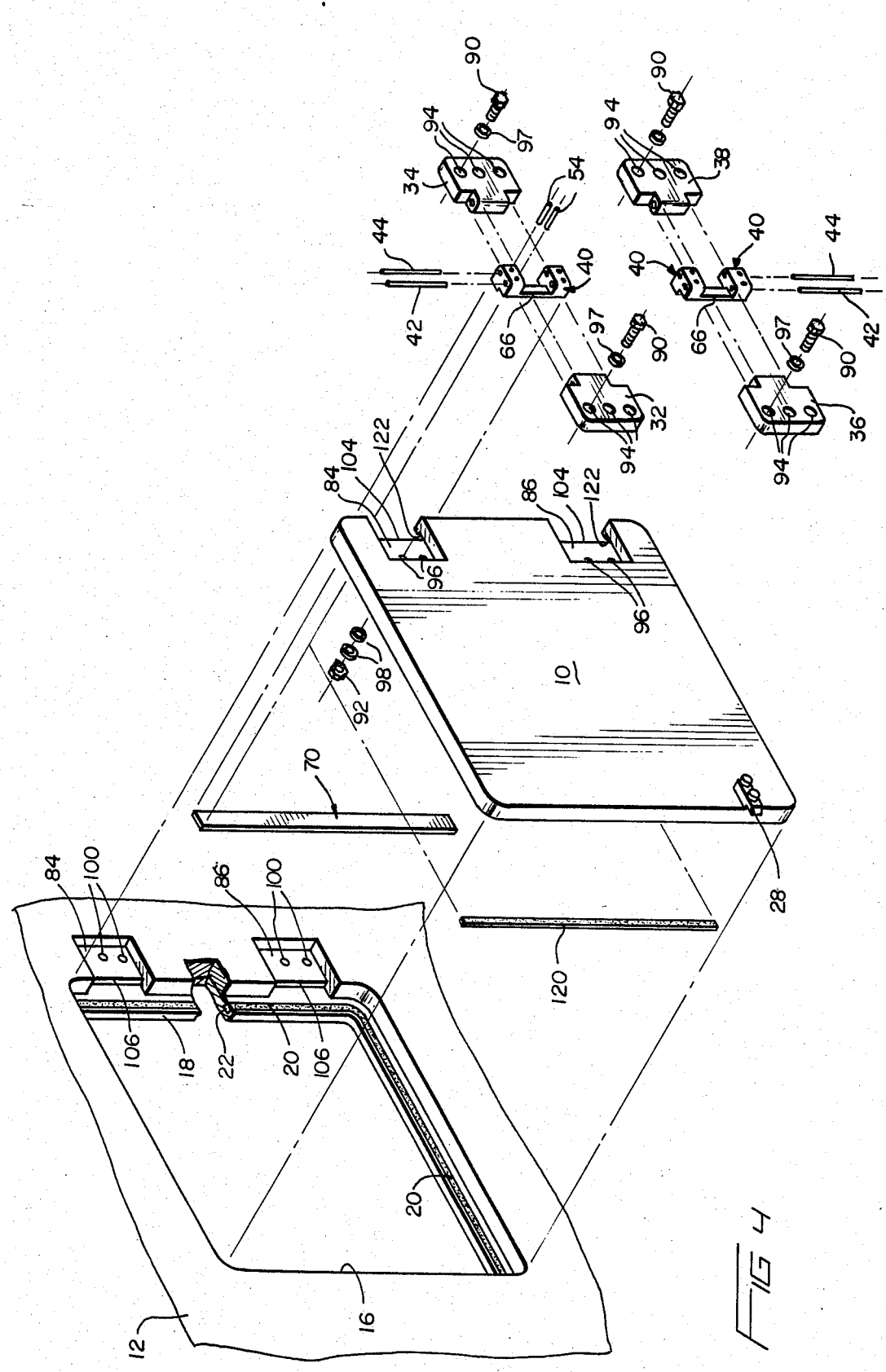
FIG. 4 is an exploded perspective view illustrating additional details of the construction of the door and the structure and indicating a preferred method of assembly.

FIG. 1 illustrates a door or closure 10 pivotally mounted on a surrounding structure 12 by a hinge assembly 14 in accordance with the invention. The door, which may be suitably contoured to conform with the contour of the exterior surface of structure 12, is adapted to be disposed within and to close an opening 16 in the structure. Structure 12 may be the hull of an armored vehicle and door 10 may be a heavy armored closure for an access opening in the side of the hull. The structure and the door may be of armor plate having a thickness of the order 1.25 inches, for example.

As best illustrated in FIG. 4, a door frame 18, attached to the inner surface, for example, of structure 12 may provide a flange about the inner periphery of the opening which projects into the opening to form a backing stop for the door. A seal 20, as of resilient material, may be attached to the flange about its periphery as, for example, by being disposed within a recess 22 in the flange, for sealingly engaging the interior surface of the door when it is in closed position. As indicated in FIG. 4 (and also in FIG. 5A), the thickness of door 10 is preferably about the same as that of structure 12 so that when the door is in closed position within the opening and engages seal 20, its exterior surface is flush with the exterior surface of the structure. Alternatively, the thickness of the door may be less than that of the structure and the opening may be formed as a stepped opening so that flange 18 is an integral contiguous part of the structure, in which case the thickness of the step between the exterior surface of the structure and the flange may be the same as the thickness of the door so that the door will be flush with the exterior surface. This would enable the elimination of a separate inwardly protruding door frame on the interior surface of the structure. A suitable latching arrangement (not illustrated) may be disposed on the interior surface of the door and on the interior surface of the structure to enable the door to be latched in closed position within the opening.

As will be described in more detail shortly, hinge assembly 14 is formed to enable the door to pivot at least 180° so that it may be swung to an open position at which its exterior surface is adjacent to the exterior surface of the structure. If desired, a spring-loaded latch assembly 26 (see FIG. 1) may be provided on the exterior surface of the structure for cooperating with a catch 28 secured to the door for holding the door in open position against the structure. A bumper assembly 30 may also be provided on the exterior surface of the hull adjacent to the latch assembly, as shown, for engagement with the door.

FIGS. 2 and 3 illustrate in more detail the hinge assembly 14 of the invention. As shown, the hinge assembly may comprise two spaced pairs of substantially identical opposed hinge plates 32, 34 and 36, 38, respectively. The hinge plates of each pair may be pivotally connected to an intermediate hinge member comprising a pair of spaced pivot blocks 40 by means of separate pivot pins 42, 44 which extend parallel through corresponding openings 46, 48 in the pivot blocks and an opening 50 formed in a centrally disposed lug 52 extending from one side of each hinge plate. Retaining pins 54 inserted into holes 56 in the pivot blocks and transversely through aligned holes 58 of the pivot pins may be employed for retaining the pivot pins within the pivot blocks. Holes 56 may extend completely through the pivot blocks from the front or outer surface 60 to the rear or back surface 62 of the pivot blocks and may be sized for a force fit with retaining pins 54. This type of connection conveniently enables the hinge plates to be disassembled from the pivot blocks by first driving the retaining pins and then the pivot pins out of the pivot blocks.

As best shown in FIG. 4, the two pivot blocks associated with the hinge plates of each pair may be connected at their back surface to a flat spacer element 66 which provides the proper spacing between the pivot blocks to receive lugs 52 of the hinge plates therebetween; and, as shown in FIGS. 2 and 3, each pair of connected pivot blocks may be connected to an outwardly facing surface of a flat elongated floating link member 70, the purpose of which will be explained shortly. As shown in these figures, and also in FIGS. 5A-C, the pivot blocks are preferably offset with respect to the link member such that the axis of one of the two pivot pins through each pivot block, the axis of pin 44, for example, is located beyond a side edge 72 of the link member, while the axis of the other pivot pin 42 is located above the link member and the opposite side edge 74 of the link member extends beyond the edge of the pivot blocks. In addition, the back surface 62 of each pivot block is preferably stepped by an amount equal to the thickness of the link member, such that when the pivot blocks are mounted offset on the link member, the back surface of the pivot blocks and a back surface 80 of the link member form a continuous planar surface, as best shown in FIGS. 5A-C. The parallel pivot pins 42, 44 define a plane which is substantially parallel to the plane of the continuous back surface 62, 80 of the pivot blocks and the flat link member.

Referring again to FIGS. 1 and 4, one hinge plate 32, 36 of each pair of hinge plates is disposed within a corresponding recess 82, 86, respectively, in the exterior surface of door 10 adjacent to a side edge thereof, and attached to the door as by bolts 90 and nuts 92, the bolts being inserted through countersunk holes 94 in the hinge plates (so that the heads of the bolts do not project beyond the outer surface of the hinge plates) and corresponding holes 96 in the recesses in the door. If desired, washers or grommets 97, 98 may be used with the bolts and nuts, as shown in FIG. 4. Similarly, the other hinge plate 34, 38 of each pair of hinge plates may be disposed within a corresponding recess 84, 88, respectively, in the exterior surface of structure 12 adjacent to opening 16, and the hinge plates connected to the structure by bolts 90 received in openings 100 in the recesses of the structure. As best shown in FIGS. 5A-C, the hinge plates are preferably pivoted on the pivot blocks such that their exterior surface is flush with the front surface 60 of the pivot blocks, and the depth of the recesses inwardly from the exterior surfaces of the door and the structure are preferably such that the hinge plates are flush with the exterior surfaces. If desired, shims (not illustrated) may be located between the hinge plates and the recesses. In addition to the door and the structure being recessed inwardly from their exterior surfaces to accomodate the hinge plates, their adjacent side edges are also recessed, as shown at 104 for the door and 106 for the structure in FIG. 4, to accomodate the pivot blocks and the floating link member.

In addition to the seal 20 provided by door frame 18, it is desirable to provide another seal between the floating link member and the back of the hinge plates and the door to ensure proper sealing in the area of the hinge assembly. Accordingly, the hinge assembly preferably includes an elongated resilient seal 120 (see FIGS. 1, 4 and 5A-C) which has a length that is substantially coextensive with the floating link member and which is adapted to be attached to the backside of hinge plates 32 and 36 and to the interior surface of the door, as indicated in FIGS. 5A-C. The interior surface of the door adjacent to recesses 82 and 86 may be formed with a groove 122 (see FIG. 4) for receiving seal 120, and the seal may be attached to the back of the hinge plates and to the door after their assembly with an appropriate adhesive. As shown in FIG. 5A, seal 120 is sized to fit within a space between the back of the hinge plates and the outwardly facing surface of the projecting portion 124 of the floating link member which extends beyond the pivot blocks. When the door is in closed position, seal 120 engages the outwardly facing surface of the link member to provide a seal between the hinges and door and the link member, and the inwardly facing back surface 80 of the link member engages seal 20 in the door frame 18 to provide a seal between the door frame and the link member. This sealing arrangement is quite effective for sealing the interior of structure 12 from water and air when the door is closed.

FIGS. 5A–C illustrate, in sequence, the operation of the hinge assembly in enabling the door to pivot 180° with respect to the structure to open position. As shown, as the door is opened 90° from closed position hinge plate 32 (and hinge plate 36) pivots with respect to pivot blocks 40 about pivot pin 42, the pivot blocks and the floating link member remaining stationary. As the door is pivoted beyond 90°, the flat side 126 of the hinge plate adjacent to lug 52 engages the front surface 60 of the pivot blocks causing the pivot blocks and the link member to pivot about the pivot pin 44 through hinge plate 34 (and also about pivot pin 44 through hinge plate 38). This enables the door to swing 180° to a fully opened position at which its exterior surface is adjacent and parallel to the exterior surface of the structure, as shown in FIG. 5C. In this position, the pivot blocks and the floating link have pivoted 90° from their original position. Thus, there is a 90° relative motion between each hinge plate and the pivot blocks about each of the two parallel axes defined by the pivot pins, with the rotation about each axis accounting for one half of the total 180° swing.

An important function of the floating link member is that it provides mechanical stability and strength to the hinge assembly, which is particularly important for a heavy door such as used on an armored vehicle, since it ties the two pairs of pivot blocks together and constrains them for concerted pivotal movement. This prevents skewing of the door during closing, which otherwise could occur, and promotes smoothness and ease of operation.

Significantly, as will be appreciated from FIGS. 5A–C, the hinge assembly of the invention is very compact and may be contained within a thickness no greater than that of the structure and the door upon which it is used. This is an advantage over bulky hinge assemblies which project beyond the doors and structures with which they are used and which are subject to damage or otherwise provide interference at the surfaces to personnel or equipment. Furthermore, as shown in FIG. 5C, in open position the hinge assembly does not project into the opening or otherwise impede access to the structure. Mounting the hinge plates in recesses in the door and structure enables the door in open position to lie against the exterior surface of the structure, as shown in FIG. 5C, well out of the way of the opening, which further facilitates access to the opening. Although the foregoing description has been with respect to an outwardly opening door, it will be appreciated that the hinge assembly is equally adaptable and advantageous for an inwardly opening door.

Referring to FIG. 4, the hinge assembly is preferably assembled by first pivotally connecting the hinge plates to the pivot blocks with the pivot pins and retaining pins, and then bolting the hinge plates to the door and to the structure. Next, the pivot blocks may be connected to the floating link member, as by welding; and lastly the resilient seal may be attached to the back of the door and the hinge plates to complete the assembly.

While a preferred embodiment of the invention has been shown and described, it will be appreciated by those skilled in the art that changes may be made in this embodiment without departing from the principles and spirit of the invention, the scope of which is defined in the appended claims.

I claim:

1. A hinge assembly for pivotally mounting a closure on an armored vehicle having an opening in its hull such that the closure in a closed position is disposed within the opening and is flush with an exterior surface of the hull and, in an open position, is pivotal at least 180° away from said opening, the hull providing a backing stop having a seal for the closure, the hinge assembly comprising first and second spaced pairs of first and second hinge plates, the hinge plates of each pair being pivotally connected to an intermediate hinge member so as to enable the first and second hinge plates to pivot about respective first and second substantially parallel axes, the first hinge plate of each pair adapted to be mounted in a first recess in the exterior surface of the hull adjacent to said opening and the second hinge plate of the pair adapted to be mounted in a second recess in another exterior surface of the closure such that the hinge plates are substantially flush with the exterior surfaces; an elongated floating link member extending between the intermediate hinge members of the first and second spaced pairs of hinge plates, the intermediate hinge members being mounted on an outwardly facing surface of the link member offset to a first side thereof such that the first axis is positioned laterally beyond the first side of the link member and such that an opposite second side of the link member extends laterally in an opposite direction beyond the second axis.

2. The assembly of claim 1, wherein the intermediate members and the link member together having a thickness not greater than the thickness of the opening.

3. The assembly of claim 1 further comprising another seal substantially coextensive with the link member and being attached to a back side of the second hinge plates and to the interior surface of the closure, said another seal being sized so as to sealingly engage the outwardly facing surface of the link member when the closure is in the closed position.

4. The assembly of claim 3, wherein said another seal is disposed within a cutout in the interior surface of the closure.

5. The assembly of claim 1, wherein each of the hinge plates has a centrally located lug and the intermediate hinge member comprises a pair of spaced pivot blocks between which the lugs of the hinge plates are received, the hinge plates being pivotally connected to the pivot blocks by pivot pins extending through the lugs and the pivot blocks along said first and second axes.

6. The assembly of claim 5 further comprising retaining pins extending transversely through the pivot blocks and through the pivot pins for retaining the pivot pins within the pivot blocks.

7. The assembly of claim 5, wherein the link member comprises a substantially flat rectangularly-shaped member and the pivot blocks have a notched base such that upon being mounted on the outwardly facing surface of the link member the base of the pivot blocks is substantially flush with the inwardly facing surface of the link member.

8. The assembly of claim 5, wherein the adjacent sides of the door and the hull are further recessed in the area of said first and second recesses in order to accomodate the pivot blocks.

* * * * *